United States Patent [19]
Bross et al.

[11] Patent Number: 5,596,185
[45] Date of Patent: Jan. 21, 1997

[54] DEVICE FOR GENERATING PICTURE INFORMATION IN REAL TIME FOR TESTING PICTURE RESOLVING SENSORS

[75] Inventors: Walter Bross, Überlingen; Bernd Uwira, Konstanz, both of Germany

[73] Assignee: Bodenseewerk Geratetechnik GmbH, Germany

[21] Appl. No.: 337,171

[22] Filed: Nov. 10, 1994

[30] Foreign Application Priority Data

Nov. 10, 1993 [DE] Germany .......................... 43 38 390.4

[51] Int. Cl.$^6$ ................................ H04N 5/33; G01D 9/42
[52] U.S. Cl. ...................... 250/208.1; 250/216; 359/291; 348/181
[58] Field of Search .............................. 250/208.1, 208.2, 250/216, 201.9; 356/121; 348/181, 187; 359/291, 292, 290

[56] References Cited

U.S. PATENT DOCUMENTS

| | | | |
|---|---|---|---|
| 5,319,214 | 6/1994 | Gregory et al. | 359/291 |
| 5,325,116 | 6/1994 | Sampsell | 346/108 |
| 5,457,493 | 10/1995 | Leddy et al. | 348/181 |
| 5,467,146 | 11/1995 | Huang et al. | 348/743 |

*Primary Examiner*—Stephone Allen
*Attorney, Agent, or Firm*—Lee, Mann, Smith, McWilliams, Sweeney & Ohlson

[57] ABSTRACT

A scene simulator for generating picture information in real time for testing picture resolving sensors, in particular for testing infrared sensors in target tracking seeker heads, comprises a micro-mechanical mirror array, which consists of a two-dimensional array of mirror elements, which are arranged to be moved between first and second operative positions in response to actuating signals. An illuminating device is arranged to uniformly illuminate the mirror array. The light of the illuminating device, in the first operative position of a mirror element, is reflected to pass by a sensor to be tested and, in the second operative position of the mirror element is reflected into the path of rays of the sensor. A picture computer and driver electronic serve to move the mirror elements into the first or second operative positions such that the sensor to be tested observes a simulated object scene.

4 Claims, 2 Drawing Sheets

DEVICE FOR GENERATING PICTURE INFORMATION IN REAL TIME FOR TESTING PICTURE RESOLVING SENSORS

BACKGROUND OF THE INVENTION

The invention relates to a device for generating picture information in real time for testing picture resolving sensors, in particular for testing infrared sensors in target tracking seeker heads.

It is known to test picture resolving infrared sensors dynamically by means of simulated object scenes. This is done in so-called HIL-installations (Hardware-in-the-Loop). In such installations, the flight of a target tracking missile is simulated from the launching up to the approach to the target. By the seeker head, tis is viewed as a "picture explosion". A simulated object as viewed by the seeker head becomes larger and larger during the approach. The sequence of scenes occurring during the flight has to be simulated in real time, i.e. at a frame sequence frequency which permits quasicontinuous representation.

When representing the object or target scene in the infrared spectral range, as required for infrared target tracking seeker heads, high resolution is required. The simulation has to permit representation of high dynamic range of the radiation levels in the individual picture elements (pixels). The radiation levels have to be able to vary within a large range. Typically, the maximum radiation level which can be represented in an object scene should be higher by a factor of 2000 than the minimum radiation level which can be represented. It must be possible to build up and to remove the radiation levels within few milliseconds, this applies also to the high radiation levels. It may well be that the maximum radiation level lies directly adjacent to the minimum radiation level. Therefore, avoiding cross-talk is of particular importance. Such strong variations of the radiation level are, in particular, required for the representation of disturbing radiation emitters (flares).

In addition, the representation of quickly variable or movable objects such as modulated disturbing radiation emitters (jammers) or of rotor blades of helicopters requires high dynamic range in time, i.e. low time constants during rise and decay of the radiation.

Infrared scene simulators are known, wherein the picture information in the infrared spectral range is generated by pointwise heating resistors and foils. In the prior art devices of this type, however, the dynamic range of the signal levels and time constants, which can be represented in this way, by no means reach the demanded values. Also there is undesirably strong cross-talk. The heat energy for generating the infrared radiation is produced within the picture matrix representing the object scene. This heat energy dissipates across the picture matrix. This results in interfering cross-talk signals. In the prior art scene simulators, these cross-talk signals have to be damped down by expensive and heavy cooling devices. This makes it difficult to mount the infrared scene simulator on a target movement frame as usually provided in HIL-installations.

Furthermore, it is known to generate the picture information by a laser, the light beam of which carries out a two-dimensional sweeping movement. To this end the light beam is directed to be reflected by a mirror system. Such a mirror system has to be very quick. Therefore, the mirror system is quite expensive. Also here, the dynamic range of the radiation levels which can be represented is limited. The syncronisation of the movements of the light spot generated by the light beam with the target tracking seeker head to be tested presents problems.

EP patent application 0,469,293 discloses a bistable, deformable mirror array which is composed of individual, pixel-like mirror elements. The individual mirror elements are pivotally mounted and arranged to be tilted by control signals into first or second positions.

SUMMARY OF THE INVENTION

It is an object of the invention to achieve, with a scene simulator operating in the infrared spectral range, high dynamic range of the radiation levels and low time constants. Cross-talk between adjacent picture elements is to be damped down to a large extent. The weight of the scene simulator is to be reduced, so that the scene simulator can be rotated in a HIL-installation with high dynamic range.

According to the invention this object is achieved by (a) a micro-mechanical mirror array, which consists of a two-dimensional array of mirror elements which are arranged to be moved between first and second operative positions in response to actuating signals, (b) an illuminating device
which is arranged to uniformly illuminate the mirror array and
the light of which, in the first operative position of a mirror element, is reflected to pass by a sensor to be tested and, in the second operative position of the mirror element is reflected into the path of rays of the sensor, (c) actuating means for moving the mirror elements into the first or second operative positions such that the sensor to be tested observes a simulated object scene.

In the device of the invention, a permanently emitting light source is provided, which, for example, emits infrared radiation. The picture is generated by tilting different mirror elements of the mirror array by means of the actuating means from their first operative positions into their second operative positions. In the first operative position, the mirror elements direct the radiation past the picture resolving sensor to be tested. These mirror elements are "viewed" by the sensor as "cold". In the second operative position, the light falling from the light source onto the mirror element is directed to an associated detector element of the picture resolving sensor. Then the sensor views the mirror element as "hot".

With such a device, there is virtually no cross-talk. The mirror array permits high resolution. Micro-mechanical mirror arrays may, for example, constructed with 2048×2048 mirror elements, the edge length of each mirror element being 20 μm. The change-over of the mirror elements can be effected with a small time constant. Furthermore, such a device permits also variation of the radiation level within very wide limits by appropriate actuation of the mirror elements.

The variation of the radiation level of a simulated object can be effected in that the picture resolving sensor to be tested has detector elements, which sum up the radiation energy impinging thereon through an integration time and which are read out at the clock frequency of this integration time, the mirror elements are arranged to be actuated with clock intervals, which are substantially shorter than the integration time of the detector elements of the sensor, and the number of clock intervals, during which mirror elements are moved by the actuation means into the second operative positions during each integration time is variable in order to vary the simulated object intensity.

Instead or in addition thereto, it is possible that the picture resolving detector to be tested has detector elements, which are arranged to be exposed to the radiation from the illuminating device through a plurality of mirror elements of the mirror array, and the number of mirror elements associated with each particular detector element, which are moved by the actuating means into their second operative positions, is variable, in order to vary the simulated object intensity.

An embodiment of the invention is described in greater detail hereinbelow with reference to the accompanying drawings.

DETAILED DESCRIPTION OF THE PREFERRED EMBODIMENT

Figure 1:
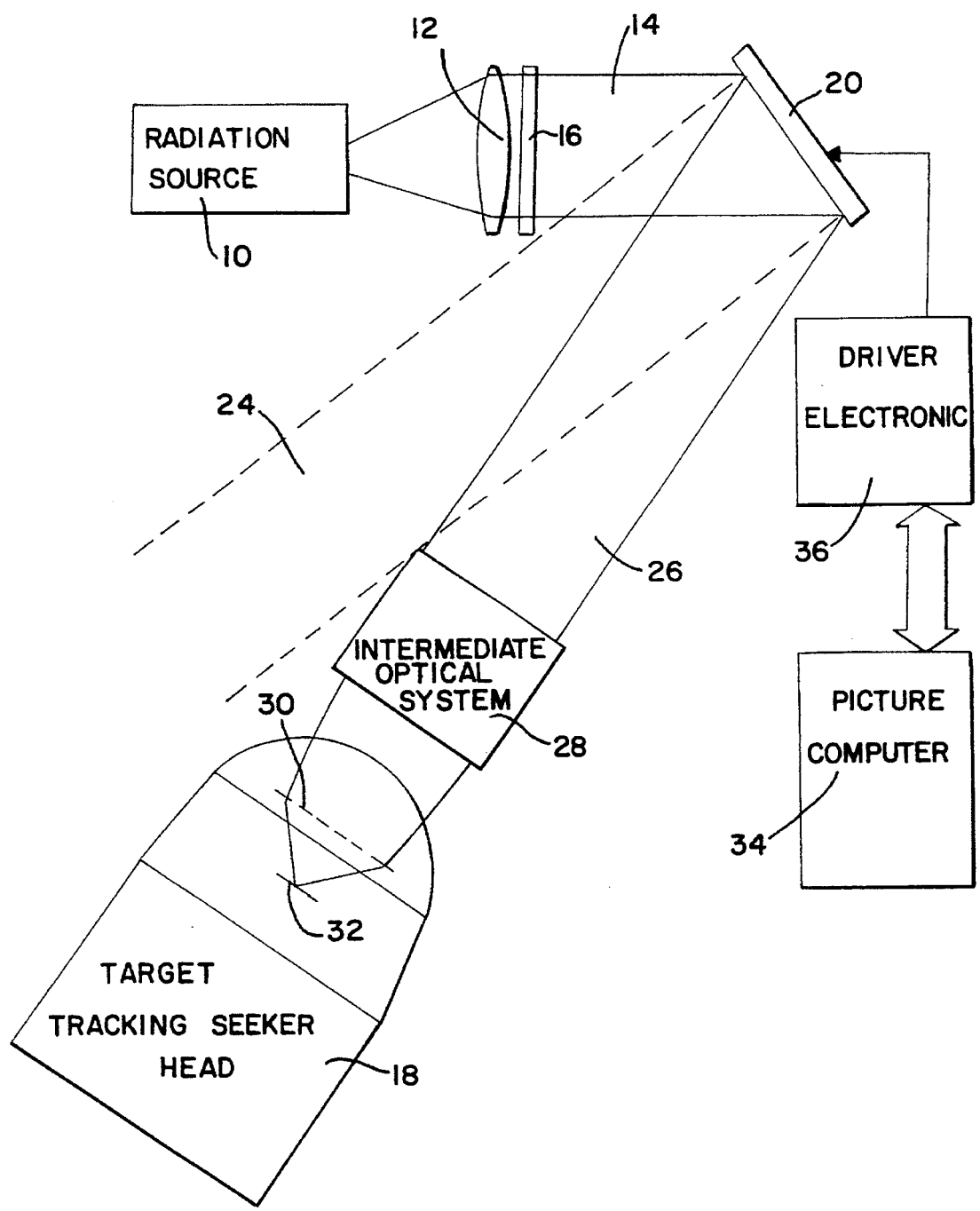
FIG. 1 schematically shows an infrared scene simulator with a target tracking seeker head under test of a target tracking missile.

Referring to FIG. 1, numeral 10 designates a radiation source for generating an intense infrared radiation. The radiation from the radiation source is collimated by means of a collimator lens 12. A spectral filter 16 is located in the parallel light beam 14 behind the collimator lens 12. The spectral filter 16 limits the radiation of the light beam to the spectral bandwidth of a target tracking seeker head 18 to be tested.

Figure 2:
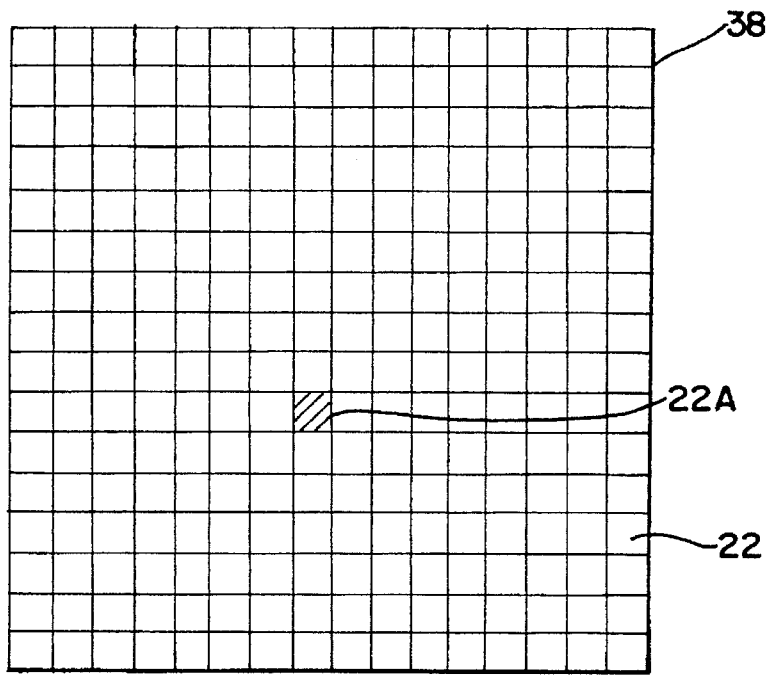
FIG. 2 shows a part of a mirror array, which is imaged on a detector element of a picture resolving sensor located in the target tracking seeker head, thus represents one pixel, during simulation of an object exhibiting minimum radiation level.

The parallel light beam 14 falls, at an angle, onto a micro-mechanical mirror array 20. The micro-mechanical mirror array is of the type described in EP-A-0,469,293. Such micro-mechanical mirror arrays are commercially available from Texas Instruments Incorporated, Dallas, Tex. under the designation "Digital Micromirror Device" or DMD. The micro-mechanical mirror array 20 is a two-dimensional array of mirror elements 22 (FIG. 2). Each of the mirror elements 22 can be moved between a first operative position and a second operative position by a binary actuating signal. The mirror array contains 2048×2048 mirror elements 22. Each mirror element is square having an edge length of 20 μm. An actuating signal of "0" brings the mirror element 22 into its first operative position, in which light incident from the radiation source 10 is reflected into the direction of the beam 24 shown in dashed lines in FIG. 1. An actuating signal of "1" brings the mirror element 22 into its second operative position, in which it reflects light incident from the radiation source 10 into the direction towards the seeker head 18 to be tested. The light is directed into the direction of the parallel beam of rays 26.

An intermediate optical system 28 directs the beam 26 to the imaging optical system 30 of the target tracking seeker head 18. The imaging optical system forms an image of the mirror array 20 on a picture resolving sensor 32. The imaging optical system of the target tracking seeker head 18 is designed to image, in normal operation, an object scene located at infinity on the picture resolving sensor 32. The intermediate optical system 28 takes care that the sensor 32 "sees" the mirror array 20, which is located at a finite distance, at intinity.

The actuating signals for the various mirror elements 22 are determined by a picture computer 34. The mirror elements 22 are actuated correspondingly through a driver electronic 36.

The picture resolving sensor 32 is a matrix detector having a two-dimensional array of 64×64 detector elements. Such matrix detectors are well-known per se and, therefore, are not described in detail here. For such a sensor 32 a target simulator having 126×128 picture elements would be sufficient in the signal processing. In a micro-mechanical mirror array 20 having 2048×2048 mirror elements, groups of 16×16 of such mirror elements can be condensed into respective pixels. This 16×16 "sub-matrix" is imaged on an associated detector element. Thus each pixel contains 256 mirror elements.

With reference to FIGS. 2 to 5 it will be explained, how the radiation level of a pixel can be varied by the actuation in space of the mirror elements.

Figure 3:
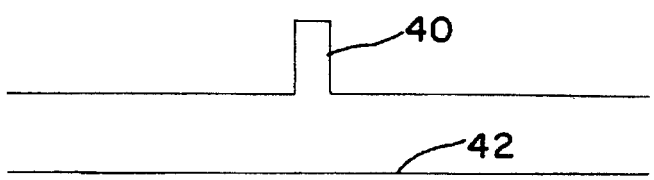
FIG. 3 shows the actuating signals for one row of the mirror array in which a single mirror element reflects light onto the sensor of the target tracking seeker head to be tested, and for the remaining rows in which all mirror elements reflect incident light past the target tracking seeker head.
Figure 4:
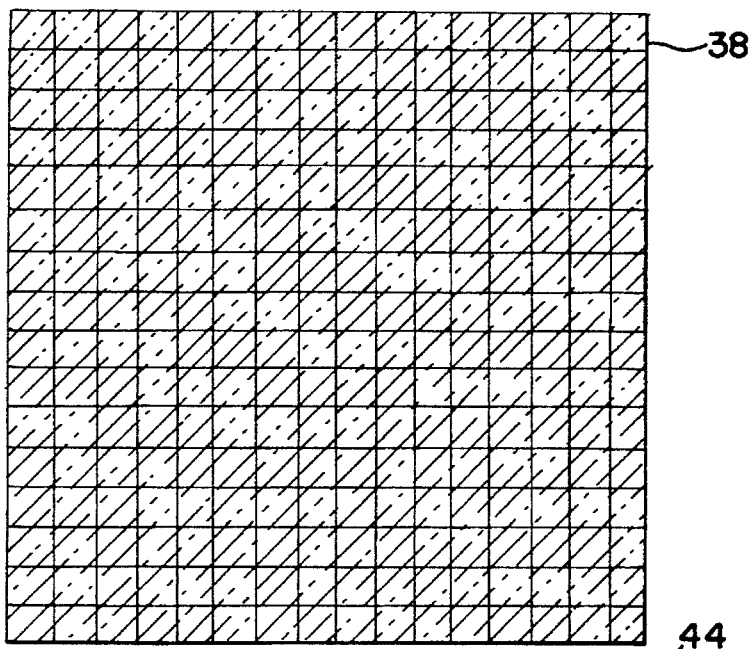
FIG. 4 shows the part of the mirror array of FIG. 2 during the simulation of an object exhibiting maximum radiation level.

FIGS. 3 and 4 show a sub-matrix 38 of the mirror array 20. The sub-matrix 38 contains 16×16 mirror elements of the mirror array 20. The sub-matrix 38 is completely imaged on an associated detector element of the picture resolving sensor 32. Other sub-matrices are —in a manner not illustrated—imaged on other detector elements of the sensor. Therefore, the sub-matrix 38 corresponds to one picture element (pixel) detected by the detector element.

Now this sub-matrix 38 can be actuated in such a way, that only one single mirror element 22A is in its second operative position. Then only that infrared radiation from the radiation source 10 falls on the detector element, which radiation is directed via this mirror element 22A. All other mirror elements 22 of the sub-matrix 38 are in their first operative positions and do not reflect radiation from the radiation source 10 onto the sensor 32. FIG. 3 schematically shows the actuating signal 40 which is applied to the mirror elements in the row of the sub-matrix 38 containing the mirror element 22A, in contrast to the actuating signal 42 of another row in which all mirror elements are in their first operative positions. The waveform 40 corresponds to the lowest signal level which can be represented in this way.

Figure 5:
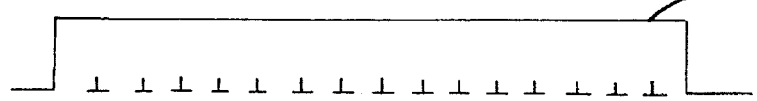
FIG. 5 shows the actuating signals for the rows of the mirror array, when this mirror array is in the state of FIG. 4.

As the other extreme, the sub matrix can be actuated to move all 256 mirror elements 22 into their second operative positions. This is illustrated in FIG. 4. Each of the sixteen rows receives actuating signals 44 (FIG. 5). This corresponds to the maximum signal level which can be represented in this way. Inbetween, 256 steps of the signal level for the respective pixel can be represented.

Typically, the individual mirror elements 22 can be changed over within 10 microseconds. Therefore, the full-frame frequency which can be represented is about 100 kilocycles per second.

As a rule, integrating detector elements are used in picture resolving sensors in target tracking seeker heads. The detector elements integrate the signals (currents) caused by the incident radiation over a predetermined integration period and are then read out. Typically, this integration period is between 80 microseconds and one millisecond. Thus 8 to 100 change-over cycles of the micro-mechanical mirror arrays lie within one integration period of the detector elements. The radiation falling on a detector element during each integration period can, therefore, be varied also by bringing the individual mirror elements 22 of the sub-matrix 38 into their second operative positions during different numbers of change-over cycles of the micro-mechanical mirror array 20. In this way, in addition to the 256 steps which result from the number of actuated mirror elements of the sub-matrix, up to one hundred additional intermediate steps can be generated. Thereby, a signal dynamic range of up to 25,600 can be reached. The lowest signal is achieved, when a single mirror element 22 is moved into its second operative position during only one change-over cycle out of one hundred change-over cycles of the mirror array 20. The maximum signal of the detector array is obtained, when, as shown in FIG. 4, all mirror elements 22 are in their second operative positions during all one hundred change-over cycles of the mirror array 20. The radiation quantities falling on the detector element and thereby the read-out signals are in a ratio of 1: 25,600.

As the micro-mechanical mirror array reflects the incident radiation, there is no undesirable heating of the micro-mechanical mirror array 20. No expensive and heavy cooling systems are required. Therefore, the system can be reduced to practice with low weight.

What we claim is:

1. A device for generating picture information in real time for testing picture resolving sensors, comprising:

(a) a micro-mechanical mirror array (20) comprising a two-dimensional array of mirror elements (22), means for moving said mirror elements individually between first and second operative positions in response to actuating signals, a plurality of submatrices, each of which, in turn, consists of a plurality of matrix elements, said mirror array (20) and said illuminating means being arranged such that light incident from said illuminating means and reflected by elements of each particular one of said sub-matrices, if said reflecting elements are in their second operating positions, falls on a particular detector element associated with said particular sub-matrix, and the number of mirror elements (22) associated with each particular detector element which are moved by the actuating means into their second operative positions, being variable, in order to vary the simulated object intensity, (b) illuminating means
        which are arranged to illuminate said mirror array (20) and
        the light of which, in the first operative position of each particular mirror element (22), being reflected to pass by a sensor (32) to be tested and, in the second operative position of the mirror element (22A) being reflected into the path of rays (26) of the sensor (32), (c) actuating means (34, 36) for actuating said moving means to move said mirror elements (22) into said first or second operative positions such that the sensor to be tested observes a simulated object scene and (d) a detector array of detector elements, the detector elements summing up the radiation energy impinging thereon through an integration time and being read out at the end of each such integration time, said integration time thereby defining a read-out frequency, wherein said mirror elements (22) are arranged to be actuated with the clock intervals, which are substantially shorter than, the integration time of the detector elements of the sensor, and the number of clock intervals, during which mirror elements (22) are moved by the actuation means into the second operative positions during each integration time being variable in order to vary the simulated object intensity.

2. A device for generating picture information in real time for testing picture resolving sensors (32), comprising:

(a) a micro-mechanical mirror array (20) comprising a two-dimensional array of mirror elements (22) and means for moving said mirror elements individually between first and second operative positions in response to actuating signals, (b) illuminating means
        which are arranged to illuminate said mirror array (20) and
        the light of which, in the first operative position of each particular mirror element (22), being reflected to pass by a sensor (32) to be tested and, in the second operative position of the mirror element (22A) being reflected into the path of rays (26) of the sensor (32), (c) actuating means (34,36) for actuating said moving means to move said mirror elements (22) into said first or second operative positions such that the sensor to be tested observes a simulated object scene, (d) a detector array of detector elements wherein (e) said mirror array (20) comprises a plurality of sub-matrices, each of which, in turn, consists of a plurality of matrix elements, said mirror array (20) and said illuminating means being arranged such that light incident from said illuminating means and reflected by elements of each particular one of said submatrices, if said reflecting elements are in their second operating positions, falls on a particular detector element associated with said particular sub-matrix, and (e) the number of mirror elements (22) associated with each particular detector element, which are moved by the actuating means into their second operative positions, being variable, in order to vary the simulated object intensity.

3. A method of testing picture resolving sensors (32) having a detector array of detector elements, comprising the steps of (a) illuminating a picture resolving sensor defining a path of rays with light reflected by a micromechanical mirror array (20) comprising a two-dimensional array of mirror elements (22) and means for moving said mirror elements individually between first and second operative positions in response to actuating signals, such that light, in the first operative position of each particular mirror element (22), is reflected to pass by a sensor (32) to be tested and, in the second operative position of the mirror element (22A) is reflected into the path of rays (26) of the sensor (32), (b) applying actuating signals to said mirror array such that the mirror elements moved to their second operative positions define a picture of a simulated object scenes, wherein (c) the detector elements of the picture resolving sensor to be tested sum up the radiation energy impinging thereon through an integration time and are read out at the end of each such integration time, said integration time thereby defining a read-out frequency, (d) said mirror elements (22) are actuated with clock intervals, which are substantially shorter than the integration time of the detector elements of the sensor, and the number of clock intervals, during which mirror elements (22) are moved by the actuation means into the second operative positions during each integration time is varied in order to vary the simulated object intensity, (e) said mirror array (20) comprises a plurality of sub-matrices, each of which, in turn, consists of a plurality of matrix elements, said mirror array (20) and said illuminating means being arranged such that light incident from said illuminating means and reflected by elements of each particular one of said sub-matrices, if said reflecting elements are in their second operating positions, falls on a particular detector element associated with said particular sub-matrix, and (f) the number of mirror elements (22) associated with each particular detector element, which are moved by the actuating means into their second operative, positions, is variable, in order to vary the simulated object intensity.

4. A method as claimed in claim 3, for testing picture resolving sensors (32) having a detector array of detector elements, wherein (a) said mirror array (20) is subdivided into a plurality of sub-matrices, each of which, in turn, consists of a plurality of matrix elements, (b) said mirror array (20) and said illuminating means are arranged such that light reflected by elements of each particular one of said sub-matrices, if said reflecting elements are in their second operating positions, falls on a particular detector element associated with said particular sub-matrix, and (c) the number of mirror elements (22) associated with each particular detector element, which are moved by the actuating means into their second operative positions, is varied, in order to vary the simulated object intensity.

* * * * *